United States Patent Office 2,944,915
Patented July 12, 1960

2,944,915
PREPARATION OF ODORLESS SOLVENT FROM A PROPYLENE TETRAMER COMPOSITION

Hans Low, Edwardsville, and William W. Reynolds, East Alton, Ill., assignors to Shell Oil Company, a corporation of Delaware No Drawing. Filed Dec. 6, 1957, Ser. No. 700,952

12 Claims. (Cl. 106—311)

This invention relates to hydrocarbon solvents and their manufacture and more particularly to the manufacture of an olefinic solvent, especially suitable for use in paint formulations, and characterized by having a low bulk odor and good solvent properties.

In recent years there has been marketed a water-base latex paint which has proven strongly competitive to the older oil-base type interior paints. The principal appeal of the water base paints has been their odor quality which is not considered objectionable by the public, whereas the odor of oil-base paints with conventional petroleum solvents is not as favorably received. For this reason, the paint industry has placed a premium on the odor characteristics of petroleum solvents and as a result there have been various methods suggested for the processing of the conventional petroleum spirits to lower their odor intensity, thereby making them more acceptable for use as solvents in paints, varnishes and resin formulations.

Perhaps the most popular odorless petroleum-derived solvent is the material prepared by alkylating a low boiling isoparaffin hydrocarbon, such as isobutane with a low boiling olefinic hydrocarbon, e.g. butylene. This alkylated product is then distilled to obtain a fraction within the paint thinner boiling range which is almost wholly saturated isoparaffin. Difficulties have been encountered in formulating paints using the alkylates due to their low solvent power for alkyd resins. This deficiency in solvent power is manifested in the formulation by higher than normal viscosities and in an extreme case, by precipitation of the resin. The solvent power of these alkylate isoparaffins for alkyd resins may be enhanced by the use of a suitable solubilizer, but the demand remains for a petroleum solvent with a still greater solvent power than generally possible by the use of a solubilizer, provided the improved solvent is otherwise acceptable.

Petroleum solvents have been usually classified as either predominantly paraffinic, naphthenic, or aromatic. Any olefins that may be present are there in very minor amounts and have been viewed as undesirable and as a source of instability since they are generally recognized as being chemically reactive and easily oxidized to undesirable substances. For this reason, little attention has been given in the past to the use of aliphatic olefins in petroleum solvents except for studies directed to their removal. There has been very little known about such important paint solvent properties of olefins as solvency for film formers and bulk and thin film evaporation characteristics, etc., beyond the belief that the objectionable odor in petroleum solvents was frequently due to the presence of olefinic materials or of oxidized derivatives of olefins.

An object of this invention is the production of an improved petroleum solvent for use, among other applications, in paints, varnishes and resin formulations. A further object of the invention is to provide a method of manufacture of an improved petroleum solvent having a low bulk odor and high solvent power. Another object is to upgrade an olefinic material to extend its field of application. An additional object is to provide improved paint, varnish and resin formulations incorporating the hydrocarbon solvent of this invention. Other objects will become apparent from the detailed description of the invention.

It has been discovered that a certain olefine containing material, namely, a composition having propylene tetramer as a principal component, when properly processed, provides a solvent with exceptionally good solvent power and a low bulk odor. It has been found that there is a considerable difference in odor among olefins (all of low oxidative product content) and that olefins with up to 8 carbon atoms per molecule are quite odoriferous, with the odor being objectionable both in intensity and quality. However, olefins of 10–12 carbon atoms have been found to have a low odor level of a rather sweet and pleasant quality, but even in the case of these olefins, trace amounts of oxidative products impart an objectionable bulk odor to an otherwise acceptable material. A particularly suitable olefinic material for solvent use is a propylene tetramer-containing composition, provided it has been properly processed to reduce its oxidative product content and inhibited with a minor amount of a suitable material to forestall oxidation. When oxidation occurs, the solvent becomes unattractive and unsuitable for most purposes even at a very low oxidation product level. The solvent of the invention being substantially odorless, may find other useful applications but it has been found that the material is particularly useful as a paint solvent.

In the improved process of the invention, a propylene polymer composition containing propylene tetramer as one of its components is fractionated to obtain a fraction containing principally the propylene tetramer and boiling within the range of about 345° F. to 550° F. In general the fraction separated should distill in as ASTM distillation test to have an initial boiling point within 345° F.–370° F. and an end boiling point not in excess of 460–550° F. Preferably, the fraction where used as a paint solvent has an ASTM boiling range of about 345°–415° F. The propylene tetramer-containing fraction is subjected to an absorbent clay treatment at a temperature less than 200° F. to reduce substantially the content of the oxidative products (e.g. alcohols, ketones and acids) contained in the fraction. The trace presence of these oxidation products destroy the good odor quality and hence the urgency in their removal. Following the treatment, the peroxide number will be less than 0.1, preferably 0.05 or less. Throughout this specification and the appended claims, the peroxide number is measured in milliequivalents of peroxide oxygen per liter. A minor and effective amount of an oxidation inhibitor is incorporated in the clay-treated propylene tetramer fraction before its peroxide number exceeds 0.1. It is all important the oxidation inhibitor be added early, since once the peroxide number becomes excessive later incorporation of the inhibitor is useless and hence, it is preferred that the oxidation inhibiting material be added immediately following clay treatment.

Propylene tetramer is produced presently as an intermediate material for detergent manufacture by the polymerization of propylene using a phosphoric acid catalyst. The crude polymer is flashed to remove chiefly the lighter dimer and trimer polymers. The remainder, the heavy polymer, is then distilled under a reduced pressure of ca. 650 mm. Hg with about 95% of that material going overhead. The distillate which is made up principally of propylene tetramer has an unpleasant odor and a relatively high peroxide number, generally between .1–10. The foregoing 95% propylene tetramer overhead has the following typical properties:

| | |
|---|---|
| Gravity, ° API | 48–51 |
| Color, Saybolt | Ca. 15 |
| S, percent w. | 0.1 |
| Br No. | 110–130 |
| ACP, ° F. | Ca. 150 |
| I.B.P., ° F. | 355–370 |
| 90% PT, ° F. | 390–415 |
| E.P., ° F. | 460–480 |

It has been found that this fraction, if properly processed in accordance with the instant invention, provides a satisfactory solvent even though made up principally of olefinic materials. Preferably (where the material is to be used as a paint solvent), the overhead cut is 80% of the volume of the material distilled under the reduced pressure, with an ASTM boiling range of about 355°–410° F.

The propylene tetramer composition does contain some materials in addition to dodecene; however, the majority of the composition is believed to be dodecene as the average molecular weight of a composition (within a boiling range of 355–410° F.) was determined as 177, compared to the theoretical molecular weight of 168 for the $C_{12}$ mono-olefin. Broadening of the boiling range has little effect on the average molecular weight.

There are two preferred clay-treating approaches for treating the propylene tetramer composition to yield a satisfactory solvent. One procedure involves a hot clay percolation alone and the other may be generally described as acid treatment followed by cold clay treatment. In the acid treatment procedure the polymerized composition prior to its foregoing described fractionation is acid treated with sulfuric acid of 80–90% strength in the proportions of 5–15 pounds of the acid per barrel of the polymerized composition. The acid treatment necessarily precedes the distillation because the acid contacting results in further polymerization and the formation of some excessively heavy polymers. The acid treated material is subsequently neutralized with an alkali and water washed. It was found, as indicated by acid number measurements, that percolation of the propylene tetramer over clay is necessary in addition to caustic and waterwash to remove the acidic contaminants completely. A small amount of clay, Attapulgus clay preferably, of say 1.7–5 pounds per barrel of the propylene tetramer is adequate. Treatment with a highly concentrated sulfuric acid is to be avoided as such treatment will not yield a satisfactory product.

In the other preferred procedure the propylene tetramer composition of the desired boiling range is clay treated at a temperature in the range of preferably 100–150° F. It is recommended that each barrel of the composition be contacted with from 15 to 30 pounds, preferably 20 pounds, of a preferably slightly alkaline clay. Various clays such as fuller's earth and bentonite, both of which contain primarily aluminum silicates may be used for the clay treatment in both the acid treatment approach and the hot clay percolation. As specific examples of suitable clays, there may be mentioned Florida earths known by various names such as Attapulgus and Florex clays. The bentonite clay known as Filtrol may also be used. The results obtained with Filtrol clay, an acid wash clay, while satisfactory were not as desirable as that obtained with neutral to slightly alkaline clays. Preferably the clay is of 30–60 mesh size.

Clay treatment of the propylene tetramer composition at temperatures above 200° F. should be avoided since such elevated temperatures yield an inferior product. No difference in clay dosage needed for odor improvement was found between batch and continuously distilled materials. A pound of clay will generally treat 0.067 to 0.033 barrel of the propylene polymer composition before it becomes unsuitable for further percolation due to a high content of absorbed odor affording contaminants. Generally speaking, the contacting of the clay, which is suitably disposed in a column, by the propylene tetramer composition will be at a rate within the range of from about 1 to 20 barrels of the composition per 400 pounds of the clay per hour.

As mentioned hereinbefore, it is essential that the oxidation inhibitor be incorporated in the treated propylene tetramer composition without delay and certainly before its peroxide number exceeds about 0.1 for the reason that once the composition has developed an objectionable odor it must be reprocessed before the oxidation inhibitor becomes effective. Conveniently, the minor amount of inhibitor needed may be added to the treated propylene tetramer composition immediately following the clay treatment. Various known petroleum oxidation inhibitors may be employed, among them are N,N'-disecondarybutyl-p-phenylenediamine, 2,6-ditertiarybutyl-4-methylphenol and 2,4-dihydroxybenzophenone. The preferred inhibitor is 2,6-ditertiarybutyl-4-methylphenol. The inhibitor N,N'-disecondarybutylphenylenediamine is more effective as an oxidation inhibitor than the 2,6-ditertiarybutyl-4-methylphenol; however, the amine compound tends to develop an off-color which makes its incorporation undesirable in most solvents, especially where the solvent is to be used, say in a clear varnish or a light-colored paint. The recommended amount of the inhibitor is about 0.1% by weight, and generally amounts less than 0.001% on a weight basis provide a too short period of protection. Generally, there is no need to use amounts larger than 0.1% since adequate protection is obtainable with it. For short storage time 0.05% inhibitor is adequate and amounts up to 0.15% may be used if desired without adverse effects. A propylene tetramer composition processed as earlier described and containing 0.1% on a weight basis of the oxidation inhibitor 2,6-ditertiarybutyl-4-methylphenol will have a satisfactory storage stability at an ambient temperature at around 80° F. for two years or longer.

EXAMPLE I

A heavy propylene polymer material, obtained by polymerizing propylene over a supported phosphoric acid catalyst under conventional conditions of 460° F. and 1200 p.s.i.g., was flashed to remove the light polymers (principally dimer and trimer). In this instance, approximately 80% of the crude polymer went overhead. The remaining heavy polymer was then subjected to a second fractionation at 650 mm. Hg with the bottom temperature being maintained at about 500° F., to obtain an 80% by volume overhead product of an ASTM distillation boiling range of 355–410° F. This fraction, which was at a somewhat elevated temperature, was first passed through a heat exchanger where its temperature was lowered to 125° F., and immediately thereafter it was percolated over 20 pounds of Attapulgus clay per barrel of the composition. On clay treatment the peroxide number dropped to 0.05. The 80% overhead cut had an average molecular weight of 177 with the majority of the hydrocarbon being dodecene. The rate of percolation throughout the clay tower was about 5 barrels of the feed per 100 pounds of the clay per hour. The material before clay treatment had a very definite unpleasant odor and following treatment possessed an unobjectionable, low odor. Immediately following the clay treatment, 0.1% by weight of 2,6-ditertiarybutyl-4-methylphenol was incorporated in the percolate product prior to contact with oxygen. The treated composition exhibited a satisfactory storage stability and possessed an acceptable low bulk odor.

EXAMPLE II

The procedure outlined in Example I was repeated with the following modifications. Following the flashing off of the light polymer material and preceding the vacuum distillation, the propylene tetramer composition was treated with 10 pounds of 87% strength sulfuric acid per barrel of the composition. This treatment resulted in a faint and pleasant odor. Prior to the treatment the material had an objectionably strong odor. The acid treated material was separated from the acid phase, neutralized with an aqueous caustic solution and then washed with water to remove the acidic contaminants. Comparable treatment with 20 pounds of the acid per barrel of the composition did not result in any improvement over the 10 pound treatment. The acid contacted composition was then distilled to provide the 80% overhead cut which again had an ASTM boiling range of about 355° F.–410° F. Following this, the 80% overhead cut was percolated over two pounds of Attapulgus clay per barrel of the material. This percolation was at a rate of about 10 barrels of the composition per 40 pounds of the clay per hour. It is necessary that the acid treatment precede the 80% overhead fractionation as it was found that the acid contacting effected some heavy polymer formation. The product had a low bulk odor and a satisfactry storage stability.

In order to compare the solvency properties of this improved olefinic solvent, a distillation cut of the propylene tetramer composition was prepared and the material treated as described in Example I to obtain a solvent with a boiling range of 360–410° F. The olefinic solvent had a molecular weight of 177 and contained as its major component dodecene. One of the solvents against which it was compared (solvent A) had the same boiling range of 360–410° F. and a composition of approximately 97% isoparaffins, with a small amount of olefinic contaminants. This material is one of the odorless petroleum solvents derived from alkylating low boiling isoparaffins with low boiling olefins. The resulting isoparaffin material while having a desirable odor is a relatively poor solvent as seen in Table I. Solvent B of Table I is another commercial solvent which has a somewhat stronger odor and is made up of approximately 65% paraffins, 6% aromatics, 28% naphthenes and a trace amount of olefinic contaminants. The bulk odor of the improved olefinic solvent of this invention had a quality near the level of solvent A. However, the solvency of the olefinic solvent was far superior to that of the isoparaffin solvent A and was substantially comparable to that of solvent B.

*Table I*

|  | Solvent A | Propylene Tetramer Solvent | Solvent B |
|---|---|---|---|
| KB | 26.0 | 31.0 | 31.0 |
| ACP, °F | 185 | 150 | 155 |
| DL, % w | 23.0 | 6.7 | 4.0 |

The data opposite KB of Table I are the kauri butanol values. ACP stands for aniline cloud point. Both the ACP and the KB values are recognized empirical measures of solvent power. The dilution limit (DL) of Table I is determined by adding small increments of solvent to a test resin until precipitation occurs. The DL is calculated by dividing the weight of the resin by the weight of solution at the increment just before precipitation. The DL is expressed in percent by weight solids and was determined at 77° F. The resin employed is an alkyd type resin formed by the esterification of phthalic acid with glycerol, modified by the addition of tall oil. The phthalic content is around 35%.

Viscosity studies were also carried out comparing the propylene tetramer solvent with the isoparaffin solvent A described above. The results of the studies appear in Table II below wherein the kinematic viscosities were measured at 77° F. The same alkyd resin used in the studies of Table I was employed in preparing the paint formulations which in each instance contained about 70% of the indicated solvent or solvent blend and 30% of the alkyd resin. Table II also contains comparative data of the solvent power of the two solvents and their blends. It will be noted that the sample which has as its solvent 100% of the isoparaffin solvent A did not flow, but as the proportion of the propylene tetramer solvent used was increased, the paint formulation became more fluid. The data as to solvent power are in conformance with that of Table I and as is to be expected in view of Table I a solvent blend of solvent A and the propylene tetramer solvent is superior in solvent power to solvent A alone.

*Table II*

| Solvent, %v. | | Viscosity of Resin Blend at 77° F., Poises | Solvent Power | | |
|---|---|---|---|---|---|
| Solvent A | Propylene Tetramer Solvent | | KB | ACP, °F. | DL, %.w. |
| 100 | 0 | No flow | 26.0 | 185 | 23.0 |
| 70 | 30 | 2,440 | 27.4 | 174 | 15.0 |
| 50 | 50 | 573 | 28.5 | 166 | 13.0 |
| 30 | 70 | 427 | 29.8 | 159 | 8.9 |
| 0 | 100 | 132 | 31.0 | 148 | 6.7 |

Thus, it is demonstrated by the several criteria of solvency, including KB, ACP, DL values and viscosity reduction ability, that the olefinic propylene tetramer solvent is superior to the isoparaffin solvent A, its saturated counterpart, and is nearly the equivalent of solvent B. Thus, it is seen that the olefinic propylene tetramer solvent combines the low bulk odor properties of the isoparaffin solvent A with the desired solvent properties of solvent B.

The behavior of the olefinic solvent in paint formulations is superior in some respects to present thinners. The alkyd resin described above in connection with Tables I and II was used in preparing a 30% resin–70% propylene tetramer thinner mixture. The resulting alkyd formulation was tested in a Stormer viscometer at 77° F. Control formulations employing solvent A and solvent B described previously in the same resin-solvent ratio were prepared and likewise tested in the viscometer. The results of this test appear in Table III.

*Table III*

Thinner: Viscosity, Kreb units
Solvent A _____ 95
Solvent B _____ 66
Propylene tetramer solvent _____ 67

The results of this test confirm again the similarity between the propylene tetramer solvent and the solvent B from a viscosity standpoint. The three foregoing flat alkyd formulations were painted on three 10 square feet panels, respectively. The bulk odor of the enamel prepared with the olefinic solvent was decidedly superior to that enamel made with the solvent B (which contains approximately 65% paraffins, 6% aromatics, 28% naphthenes and a trace of olefins) and only slightly inferior to the bulk odor of the enamel containing the isoparaffin solvent A.

Another important property of a paint thinner is its rate of release from the paint film. In Table IV the 100% evaporation times of the olefinic solvent, the isoparaffin solvent A and solvent B are compared and in addition, there is a comparison of the drying times (set touch time) of the enamel formulations at 77° F. It will be noted that the paint film made from the propylene tetramer-

*Table IV*

| Thinner | 100% Evaporation time, Min. | Drying Time, Min. |
|---|---|---|
| Solvent A | 157 | 205 |
| Solvent B | 148 | 200 |
| Propylene Tetramer Solvent | 158 | 145 | containing formulation has a drying time approximately 25% less than the films of the other two solvents.

The propylene tetramer solvent is especially suitable in the preparation of surface coating compositions or paint formulations containing an air drying alkyd resin. Alkyd resins are formed by the esterification of poly acids such as phthalic, maleic and succinic acids with polyhydroxy alcohols such as glycerol and pentaerythritol. The properties of alkyd resins are frequently modified by the addition of certain other substances, notably drying oils, which increase the resin usefulness. Such modified alkyd resins are converted to an insoluble hard form upon exposure to air at ordinary temperatures. Various air drying resinous esters are described in the Hans Low U.S. Patent 2,795,563, issued June 11, 1957. It is contemplated that the olefinic propylene tetramer composition of this invention and blends thereof may be substituted for the solvent disclosed in that application in the proportions therein disclosed. Normally, the solvent will make up from 65 to 90% of the formulation with the air drying resinous ester comprising 10–35% by weight.

The propylene tetramer composition may be used alone as a solvent or in a suitable blend with other solvent materials, for example, where it is desired, say to increase the solvent power of the other component of the blend without depreciating the bulk odor thereof, as in the instance of a blend of the propylene tetramer composition and an isoparaffin alkylate type solvent. This particular solvent blend as illustrated in foregoing Table II may contain varying amounts of the propylene tetramer but generally it will constitute at least 50% of the blend, and, depending on the proportion used, will accordingly enhance the solvent power of the isoparaffin alkylate component. It is contemplated that the olefinic solvent of the invention may be added to other types of solvents in addition to the alkylates and where so blended the added propylene tetramer composition will impart its characteristic properties to the extent of its incorporation.

We claim as our invention:

1. A process of manufacturing a substantially odor-stable, olefinic solvent characterized by a low bulk odor and good solvent power which comprises preparing a propylene polymer composition containing propylene tetramer as one of the components, fractionating said polymer composition to obtain a fraction containing principally the propylene tetramer and having a boiling range within the temperature range of 345° F. to 550° F., subjecting the fraction to an adsorbent clay treatment at a temperature less than about 200° F. to reduce substantially the content of the oxidative products contained in said fraction, and incorporating a minor, effective amount of an oxidation inhibitor in the clay-treated fraction before its peroxide number exceeds 0.1, said inhibitor being incorporated in the fraction in an amount in excess of 0.001% on a weight basis.

2. A process in accordance with claim 1 wherein the clay treatment is at a temperature in the range of 100–150° F.

3. A process in accordance with claim 1 wherein each barrel of the propylene tetramer fraction is percolated at a temperature in the range of 100–150° F. over 15 to 30 pounds of clay.

4. A process in acordance with claim 1 wherein the oxidation inhibitor is selected from the group consisting of N,N'-di-secondarybutylphenylenediamine, 2,6-ditertiarybutyl-4-methylphenol and 2,4-dihydroxybenzophenone, and is present in an amount in excess of 0.001% by weight.

5. A process in accordance with claim 1 wherein the oxidation inhibitor is 2,6-ditertiarybutyl-4-methylphenol and is incorporated in an amount of about 0.1% by weight.

6. A process in accordance with claim 1 wherein the polymerized composition prior to its fractionation is acid-treated with sulfuric acid of 80–90% strength in the proportions of from 5 to 15 pounds of sulfuric acid per barrel of the product and the acid treated material is subsequently neutralized with an alkali and then water washed.

7. A process in accordance with claim 1 wherein the propylene tetramer fraction has a boiling range of about 345° F. to 415° F.

8. An improved solvent comprising essentially a propylene polymer composition containing propylene tetramer as its principal component, boiling within the range of 345° F. to 550° F. and having a peroxide number less than 0.1 and also containing a minor and effective amount of a petroleum oxidation inhibitor said inhibitor being present in an amount in excess of 0.001% on a weight basis of the propylene polymer composition.

9. An improved solvent in accordance with claim 8 wherein the propylene tetramer-containing composition has a boiling range of about 355–410° F. and wherein the oxidation inhibitor is selected from the group consisting of N,N'-di-secondarybutylphenylenediamine, 2,6-ditertiarybutyl-4-methylphenol and 2,4-dihydroxybenzophenone, which inhibitor is present in an amount in excess of 0.001% by weight.

10. An improved solvent in accordance with claim 9 wherein the oxidation inhibitor is 2,6-ditertiarybutyl-4-methylphenol incorporated in an amount of about 0.1% by weight.

11. A solvent blend comprising essentially a propylene polymer composition containing propylene tetramer as its principal component, said composition boiling within the range of 345° F. to 415° F. and having a peroxide number less than 0.1, and a minor and effective amount of an oxidation inhibitor, said inhibitor being present in an amount in excess of 0.001% on a weight basis of the propylene polymer composition, together with at least one other solvent which is an alkylate containing essentially a mixture of isoparaffinic hydrocarbons obtained by alkylating a low boiling isoparaffin hydrocarbon with a low boiling olefinic hydrocarbon.

12. A solvent blend containing the solvent of claim 8 as a principal component and present therein in a predominant amount, together with at least one other solvent.

References Cited in the file of this patent

UNITED STATES PATENTS

| | | |
|---|---|---|
| 2,638,412 | Browder | May 12, 1953 |
| 2,799,718 | Scovill et al. | July 16, 1957 |
| 2,814,655 | Langlois et al. | Nov. 26, 1957 |